No. 820,887. PATENTED MAY 15, 1906.
J. W. McGUIRE.
MOTOR PLOW.
APPLICATION FILED JULY 6, 1905.
5 SHEETS—SHEET 1.
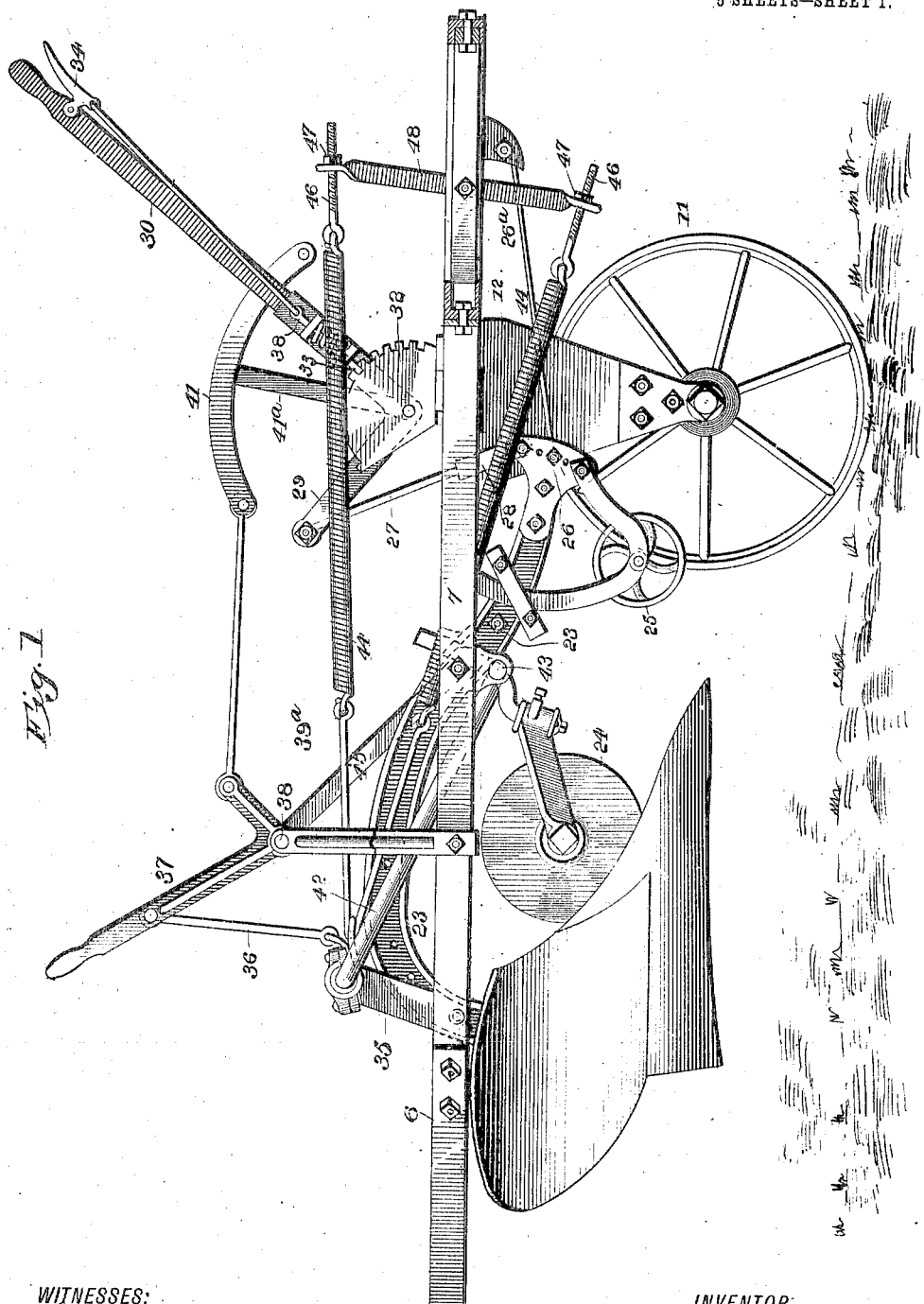
WITNESSES:
E. C. Duffy
Amos W. Hart
INVENTOR
John W. McGuire
BY Munn & Co.
ATTORNEYS

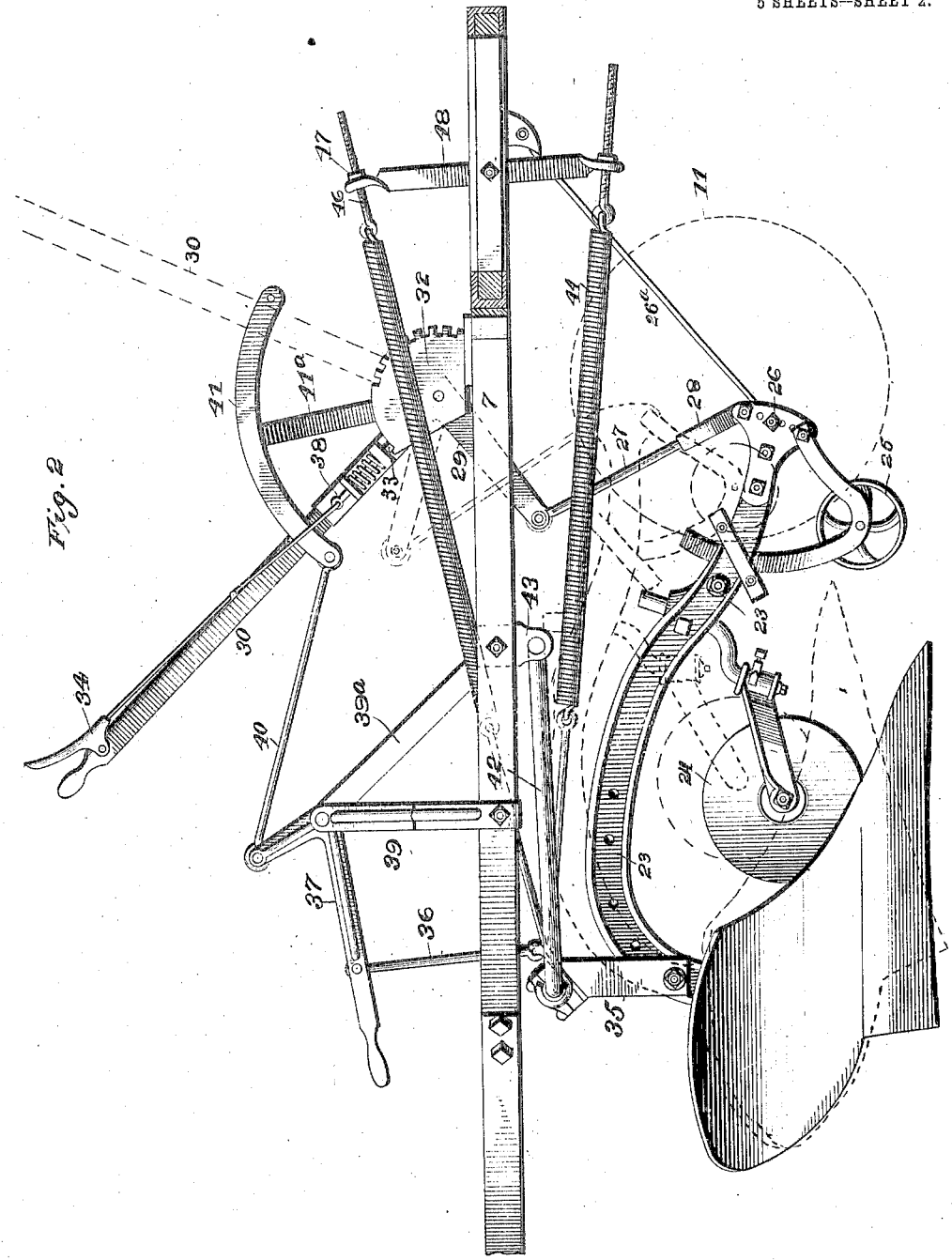

No. 820,887. PATENTED MAY 15, 1906.
J. W. McGUIRE.
MOTOR PLOW.
APPLICATION FILED JULY 6, 1905.
5 SHEETS—SHEET 3.
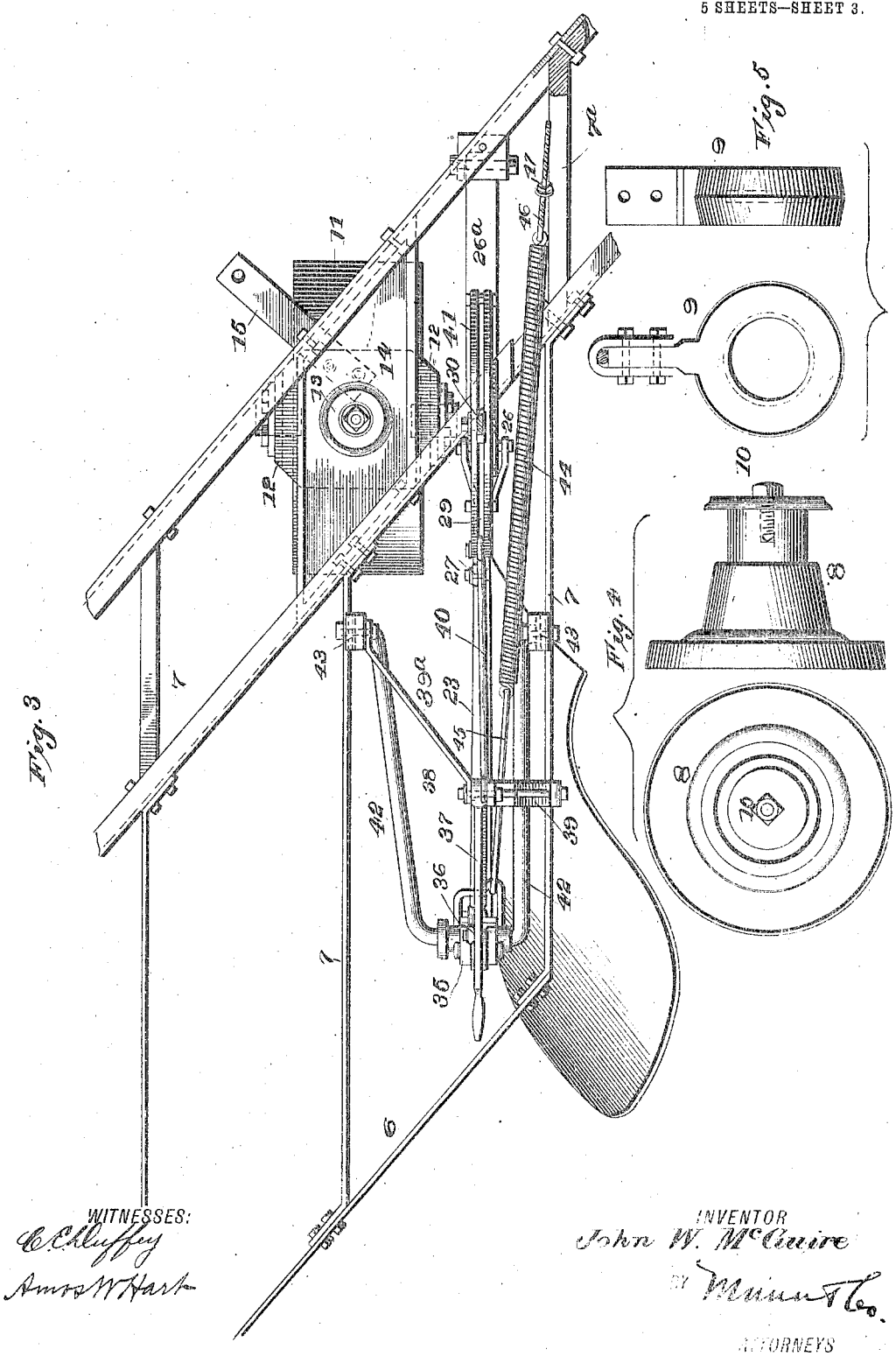
WITNESSES:
INVENTOR
John W. McGuire
ATTORNEYS No. 820,887. PATENTED MAY 15, 1906.
J. W. McGUIRE.
MOTOR PLOW.
APPLICATION FILED JULY 6, 1905.
5 SHEETS—SHEET 4.
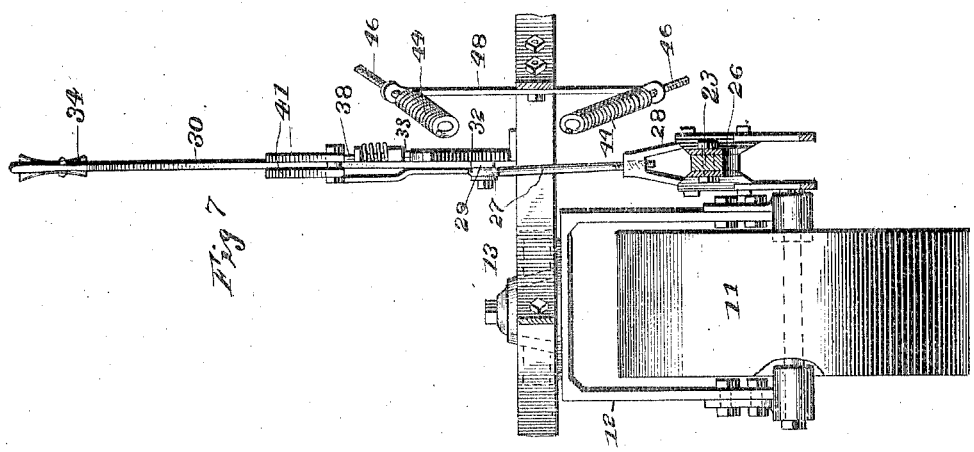
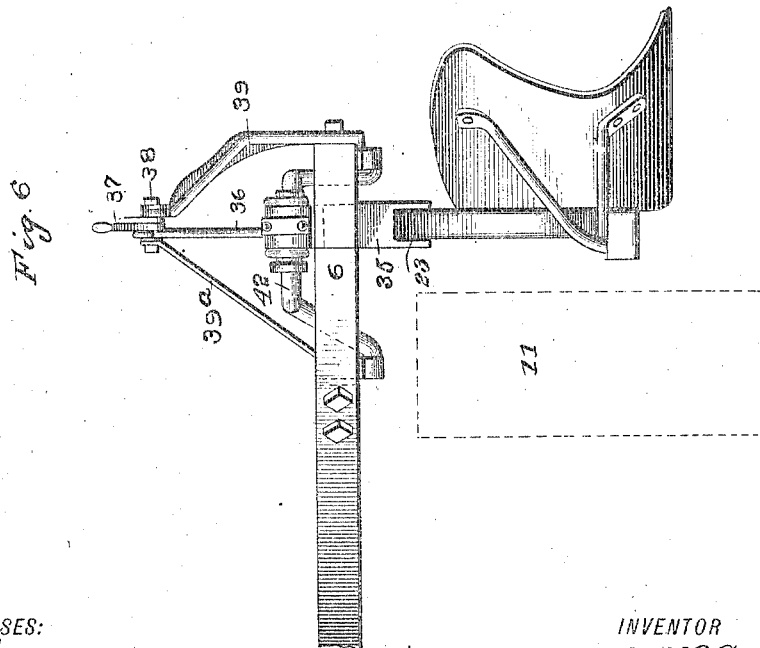
WITNESSES:
INVENTOR
John W. McGuire
BY
ATTORNEYS No. 820,887. PATENTED MAY 15, 1906.
J. W. McGUIRE.
MOTOR PLOW.
APPLICATION FILED JULY 6, 1905.
5 SHEETS—SHEET 5.
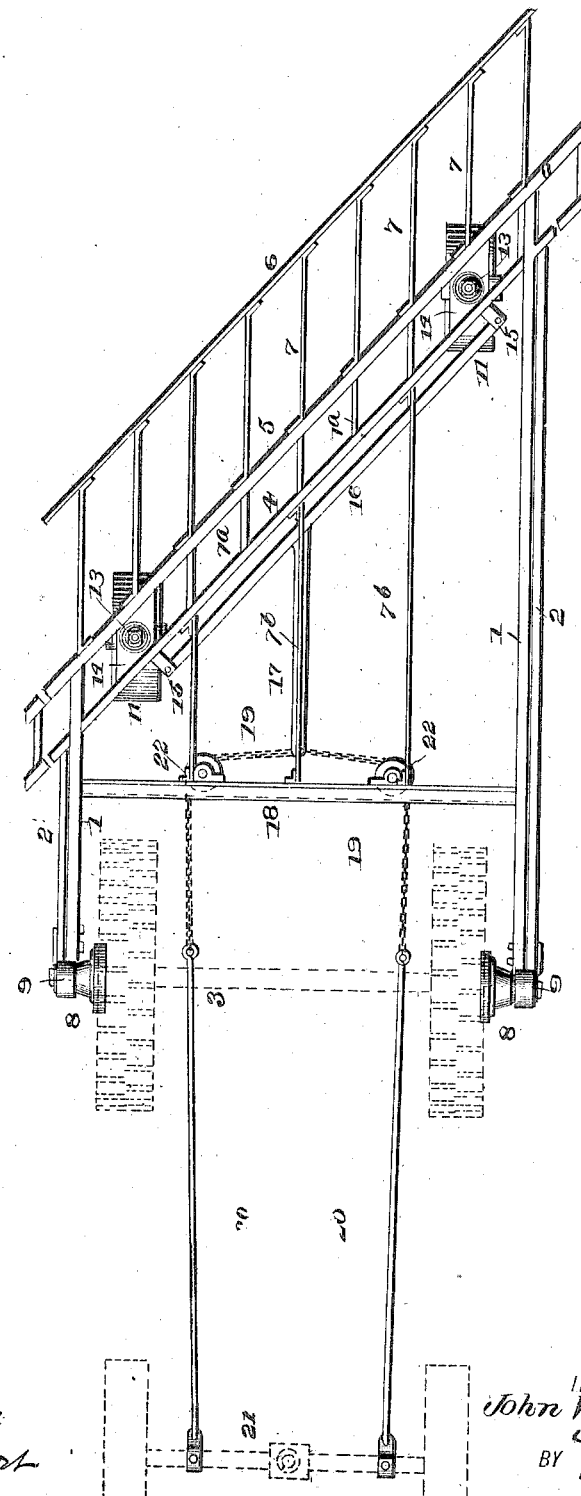
WITNESSES:
INVENTOR
John W McGuire
BY
ATTORNEYS

UNITED STATES PATENT OFFICE.

JOHN WILLARD McGUIRE, OF JOLIETTE, NORTH DAKOTA, ASSIGNOR OF ONE-FOURTH TO GEORGE F. OGG, OF MINNEAPOLIS, MINNESOTA, AND ONE-FOURTH TO DANIEL DOW, OF GRAND FORKS, NORTH DAKOTA.

MOTOR-PLOW.

No. 820,887.    Specification of Letters Patent.    Patented May 15, 1906.

Application filed July 6, 1905. Serial No. 268,363.

*To all whom it may concern:*

Be it known that I, JOHN WILLARD MCGUIRE, a citizen of the United States, and a resident of Joliette, in the county of Pembina and State of North Dakota, have made certain new and useful Improvements in Motor-Plows, of which the following is a specification.

My invention is an improvement in gang-plows propelled by steam, traction-engines, or other motors. The plows proper are arranged in gang in a frame of peculiar construction, which is connected with the motor proper, the plows being in a line inclined or oblique to the axle of the motor, so that one works slightly in advance of or in rear of the adjacent one. Each plow is adapted for independent adjustment vertically not only as a whole or bodily, but also at the point and heel, so that its pitch may be varied as required for entering the soil or running at different depths therein.

The invention includes means for effecting such vertical adjustment and change of pitch, also the construction of the frame and means for supporting and guiding the same and connecting it with the motor, all as will be hereinafter described, and as illustrated in the accompanying drawings, in which—

Figure 1 is a side elevation of a portion of the plow-frame, part being in vertical section, one of the plows of the gang being shown elevated or in the position required when the plow is out of use or traveling from one point to another. Fig. 2 is a view similar in essentials to Fig. 1, save that the plow proper is shown in position for work in the soil. Fig. 3 is a plan view of a portion of the frame and one of the plows of a gang arranged therein. Fig. 4 includes face and side views of the coupling by which the plow-frame is connected with the axle of the motor. Fig. 5 shows side and edge views of portions of such coupling. Fig. 6 is a rear end view of a portion of the frame, together with one of the plows proper connected therewith. Fig. 7 is a vertical transverse section in a plane adjacent to one of the transporting-wheels, upon which the plow-frame is supported. Fig. 8 is a plan view of the plow-frame, together with the couplings that connect it with the motor and the means for steering the frame with its attached plows.

Referring in the first instance to Figs. 3 and 8, it will be seen that I provide a frame which is constructed of bar and channel iron and connected by bars 1 2 with the axle 3 of the motor. Three bars 4 5 6 extend parallel to each other and diagonally or inclined to the axle of the motor, the same being spaced apart, and the bars 4 5, which are nearer each other, being rigidly connected with the draft-bars 1 and 2. The rear bar 6 is connected with the parallel bar 5 by means of a series of bars 7, having their ends bent laterally at an obtuse angle and secured by bolts. The bars 4 5 are similarly connected by short bars 7ª. The bar 4 is in turn connected with a cross-bar 18 by means of parallel bars 7ᵇ. I thus form a light but strong and rigid frame. The plows proper are arranged in the spaces between the transverse bars 7 and the main bars 5 and 6, as will be presently described in detail. The front ends of the draft-bars 1 2 are connected with an extended hub 8 (see Fig. 4) of the motor-axle 3 by means of a coupling 9. (See Fig. 5.) The latter is secured upon the journal of the hub 8 by means of a screw 10, (see Fig. 4,) and the draft-bars 1 2 are in turn suitably bolted to a pendent shank of the part 9, as will be readily understood. It is apparent that by this construction and arrangement of parts the front end of the plow-frame is duly supported. The rear or main portion of the plow-frame is supported upon transporting-wheels 11, whose arrangement is indicated in Fig. 8. As shown in Figs. 1 and 7, these wheels 11 are mounted upon an axle journaled in bearings attached to the vertical arms of a bifurcated frame 12, the latter having a tapered journal which is fitted in a box or bearing 13, secured to a horizontal plate 14, that is in turn suitably secured between the oblique frame-bars 4 and 5.

As shown in Fig. 8, the wheels 11 are located each near one side of the frame. They constitute, in effect, caster-wheels, since they are pivoted so that they may be turned horizontally as required to assist in guiding the motor and gang plow as a whole. To this end I attach to the bifurcated frames 12 horizontal arms 15, and I connect the two arms by a rod 16, the same having a lever-arm 17, that extends forward into proximity to a cross-bar 18, that rigidly connects the draft-bars 1. The lever 17 is connected by chains 19 with rods 20, connected with the front pivoted axle 21 of the motor. The said chains 19 run on grooved pulleys 22, which are pivoted in bearings attached to the aforesaid crossbar 18 at points equidistant from the longitudinal middle of the plow-frame. It is apparent that when the front axle 21 of the motor-carriage is turned on its pivot the lever 17 will be swung correspondingly to the right or left and that thereby the running-wheels 11 will be similarly adjusted at an inclination right or left, so that the plow-frame will be guided in the arc of a circle corresponding to that described by the front wheels of the motor, with which the said wheels 11 track, as shown.

The arrangement of the plows proper and their operating mechanism with and relative to the frame will now be described. As shown in Figs. 1 and 2, the plow proper is constructed in a well-known manner and provided with a curved channeled beam 23, and to this a rolling colter 24 and a gage-wheel 25 are attached in the usual way. To the plow-clevis 26 is attached a draft-bar 26ᵃ, which is pivoted to a lug pendent from the frame. The clevis is further connected by a rod 27 and swivel-clevis 28 with the shorter arm 29 of a lever 30, which is pivoted at 31 in suitable bearings, the same being formed in part of a toothed segment 32, which is rigidly secured in place on the frame of the machine. The longer arm 30 of said lever is provided with a slidable pawl 33 for engaging the toothed segment, the same being operated by a hand-lever and rod 34 in the usual way. It is apparent that by swinging the lever 30 in a vertical plane forward or back the front end of the plow-beam 23 will be adjusted higher or lower correspondingly.

The rear end of the plow-beam 23 is connected by a clevis 35 and rod 36 with an elbow-lever 37, which is pivoted at its angle 38 to a vertical standard 39, having diagonal braces 39ᵃ, secured rigidly to the frame of the machine. The rear arm of the elbow-lever 37 projects upward and rearward and is suitably constructed to adapt it to be grasped and manipulated for adjusting the plow as may be required. The shorter arm of said lever is connected by a rod 40 with a device 41, which in view of its form and function I term a "quadrant-lever."

As shown best in Figs. 2 and 3, the part 41 consists of a curved head or segment composed of two parallel bars which are connected at their ends and between which the lever 30 works, and a rigid bar 41ᵃ, which is connected with said curved bars and pivoted at 31, or, in other words, at the same point where the lever 30 is fulcrumed. The clevis 35 before referred to straddles the plow-beam 23 and is pivoted thereto at a point adjacent to the plow-shear or moldboard. The upper end of said clevis 35 is pivotally connected with the middle portion of the U-shaped or arched bar 42, whose forward ends are curved laterally and pivoted in lugs or short hangers 43, that are attached to and pendent from parallel and adjacent bars 7 of the frame. This arched bar 42 serves to hold the plow in the required position relative to the frame and other parts. The operation of the parts connected with the plow proper and thus far described will now be understood. When the lever 30 is adjusted in vertical position, as shown in Fig. 1, both the front and rear ends of the plow-beam will be raised, and thereby the plow proper will be held elevated above the ground as required when not in use or when the machine is traveling or being transported from place to place. The plow is, however, capable of adjustment for inclining the point downward as required to give it the proper pitch for entering the soil, or its point may be raised and its heel inclined downward, as shown by dotted lines, Fig. 2, these movements being effected by one and the same lever 30 through the medium of its connections with the plow, as before described—that is to say, when the lever 30 is thrown back or inclined to the left, as shown in Fig. 2, the front or clevis end of the plow-beam will obviously be carried downward and the plow lowered as a whole so that the plow will be held in the position required for actual work. It will be seen that when the lever 30 is thrown to the position indicated it carries the quadrant-lever 41 with it, so that, through the medium of the rod 40, the elbow-lever 37 is tilted in such manner as to allow the rear end of the plow-beam to be lowered. If, on the other hand, the lever 30 be thrown to the right, as shown by dotted lines, Fig. 2, the front end of the plow-beam will be raised through the medium of the clevis-rod 27 and the rear end of the plow-beam will be similarly raised through the medium of the elbow-lever 37, connecting-rod 36, and clevis 35. Thus, in brief, the front end of the plow-beam will be raised without stirring the rear end, so as to run the plow up out of the ground, or, reversely, the front end may be pitched downward without changing the position of the rear end, and, again, through the medium of the same lever the plow proper may be raised bodily above the ground or soil.

Coil-springs 44 are connected at one end with the free end of the arch 42 by means of a rod or rods 45, and their opposite ends are attached to screws 46, which are adjustably connected with the opposite ends of a vertical equalizing-bar 48, that is pivoted at its middle to a portion of the frame. The screws 46 and nuts 47 applied thereto, as shown in Figs. 1 and 2, provide for adjustment of the tension of the springs as conditions may require. It is obvious that the bar 48 will rock on its pivot so that the springs 44 may shift up and down, according as the plow proper is adjusted higher or lower. These springs act for a double purpose—namely, one assists in raising the plow out of the ground and the other assists in steadying the plow in the ground, while both assist in holding the plow elevated when out of the ground.

It will be seen that by means of my invention as herein illustrated and described I provide a series of plows in gang, each of which works independently of the other, so that it may be raised or lowered without in any way affecting or interfering with the other; also, that by the lever mechanism each plow may be easily manipulated for causing it to enter the soil or taking the horizontal position therein or elevating its point to bring it quickly out of the soil; also, that I provide means to assist in raising and lowering each plow as a whole and in holding the rear end of each plow suspended while the front end is being lowered and that they assist in steadying the plow in the ground.

The plows will be ordinarily set to run at a uniform depth, but any of them may be adjusted to run at a greater or less depth than the others or thrown entirely out of action, according to the nature of the soil or obstructions or other conditions. Taking the frame and the several plows together, they are adapted to work most effectively and may be attached to any traction-engine of ordinary construction.

What I claim is—

1. The combination, with the axle of a motor, of a gang-plow frame having parallel side bars extended forward, hubs adapted to receive and extend from the said axles and having reduced cylindrical portions at their outer ends, and couplings which are applied to and rotatable on such reduced portions and connected with the said side bars, substantially as described.

2. A gang-plow frame formed of cross-bars and longitudinal bars arranged at an angle to the former, all rigidly connected, and side bars extending forward and provided with rigid couplings, and extension-hubs adapted for attachment to a motor-axle and for rotatable connection with the said couplings, substantially as described.

3. The combination, with a frame and a plow proper, of means for raising and lowering the latter, the same comprising a main lever and a supplementary lever connected with the front and rear ends of the plow-beam, respectively, means for connecting the two levers, the same comprising a pivoted quadrant which the main lever engages and by which it is shifted, and a rod connecting such quadrant with the rear lever whereby the latter is shifted by the quadrant when the main lever is thrown forward or backward, substantially as described.

4. The combination, with a wheeled frame and a plow proper, of mechanism for raising, lowering, and tilting the plow, the same comprising the main lever 30 and a fixed toothed segment to which the lever is pivoted, a pivoted quadrant-lever, or tappet, 41, adapted to swing fore and aft in a vertical plane, and mechanism for connecting the main lever and quadrant with the respective ends of the plow-beam, substantially as described.

5. The combination, with a frame and a plow proper, of the lever 30 connected with the front end of the beam, a second lever 37 connected with the rear end of the beam and having a handle for use in raising the plow, and a rod 40 connecting the two levers, whereby when the rear lever is raised the front one is thrown forward and the front end of the plow also raised, as described.

6. The combination, with a plow-frame and plow proper, of a bar 42 which is pivotally connected with the rear end of the beam and extends forward and is pivotally connected with the frame whereby it serves to hold the plow in due position and also as a fulcrum on which the plow swings in its upward and downward movement, a draft-bar 26ª which is pivotally connected with the frame and front end of the plow-beam, and lever mechanism mounted on the frame and connected with the plow-beam whereby the latter may be raised and lowered so as to swing on the fixed pivot ends of the bars 42 and 26ª, as described.

7. The combination, with a frame composed of longitudinal bars and transversely-inclined bars, of plows arranged in the spaces between the said bars, and means for pivotally connecting the opposite ends of the plow-beams with the said frame, and means for raising and lowering the plows, substantially as described.

8. The combination, with a frame, a plow proper, and a swinging bar which is pivoted at its respective ends to the frame and the rear end of the plow-beam, lever mechanism for raising and lowering the plow, and an equalizing spring attachment comprising two coil-springs connected at their rear ends with the plow-beam and an equalizing-bar pivoted in vertical position and connected with the front ends of the springs, all adapted to operate in the manner described.

9. The combination, with a plow-beam and a plow proper, of the draft-bar 26ª which pivotally connects the front end of the beam with said frame, and a steadying and fulcrum bar 42 which is pivotally connected with the frame at its front end and also with the plow-beam at its rear end, and means for raising and lowering the plow, substantially as described.

10. The combination, with the wheeled plow-frame, of a plow and plow-beam, pivoted draft and fulcrum rods 26ª and 42, connecting opposite ends of the beam with the frame, lever mechanism for raising and lowering the plow, and a spring attachment secured to the forward portion of the frame and connected with rear end of the plow-beam, which is adapted to swing above and below the frame, so that the spring attachment aids in holding the plow elevated and also steadies it in the lowered or working position, substantially as described.

11. The combination, with the wheeled plow-frame, of a plow and plow-beam, pivoted draft and fulcrum rods 26ª and 42, connecting opposite ends of the beam with the frame, lever mechanism for raising and lowering the plow and beam, and a spring attachment comprising a bar arranged vertical and pivoted at its middle to the plow-frame in advance of the plow, a spiral spring connecting the respective ends of such bar with the rear upper portion of the plow-beam, the fulcra of the beam being arranged in such relaton to the pivot of the bar to which the springs are attached, that when the beam is raised or lowered the springs exert traction in such manner as to assist in holding the plow and beam above the frame and to steady it when lowered below the frame in working position, substantially as described.

JOHN WILLARD McGUIRE.

Witnesses:
ALEX. STENSBY,
C. R. GREEN.